(No Model.) 3 Sheets—Sheet 1.

W. L. IMLAY.
PHOTOGRAPHIC SHUTTER.

No. 361,947. Patented Apr. 26, 1887.

WITNESSES
Will He Powell.
J. B. McGirr.

INVENTOR
William L. Imlay
By Connolly Bros.,
Attorneys.

(No Model.) W. L. IMLAY. 3 Sheets—Sheet 2.
PHOTOGRAPHIC SHUTTER.

No. 361,947. Patented Apr. 26, 1887.

United States Patent Office.

WILLIAM L. IMLAY, OF CAMDEN, NEW JERSEY.

PHOTOGRAPHIC SHUTTER.

SPECIFICATION forming part of Letters Patent No. 361,947, dated April 26, 1887.

Application filed May 18, 1886. Serial No. 202,563. (No model.)

*To all whom it may concern:*

Be it known that I, WILLIAM L. IMLAY, a citizen of the United States, residing at Camden, in the county of Camden and State of New Jersey, have invented certain new and useful Improvements in Photographic Apparatus; and I do hereby declare the following to be a full, clear, and exact description of the invention, reference being had to the accompanying drawings, which form part of this specification, in which—

Figure 1:
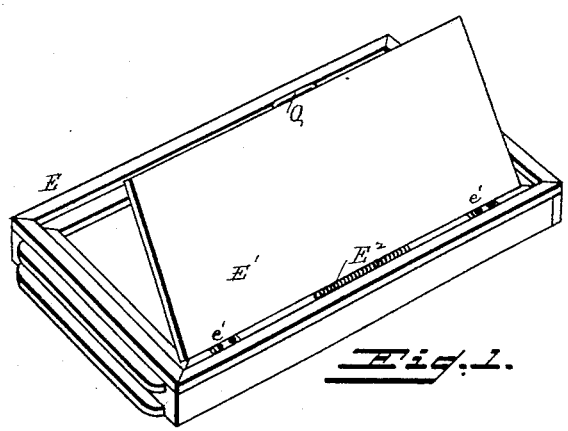
Figure 2:
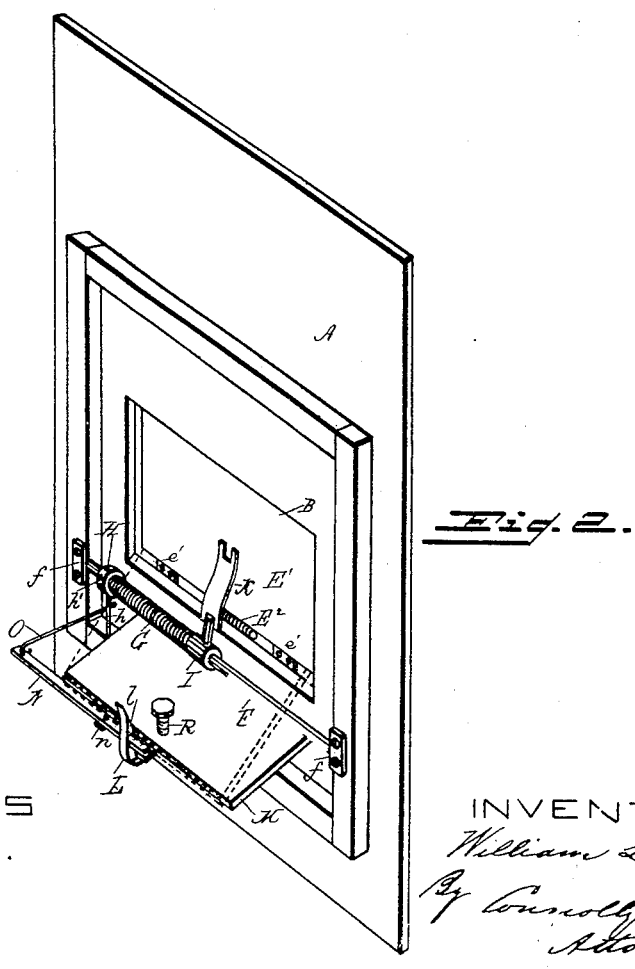
Figure 3:
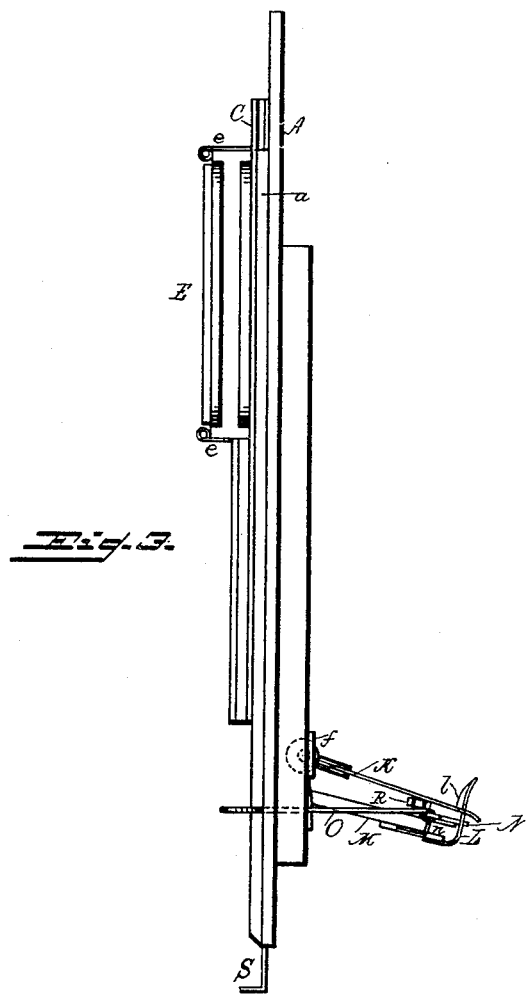
Figure 4:
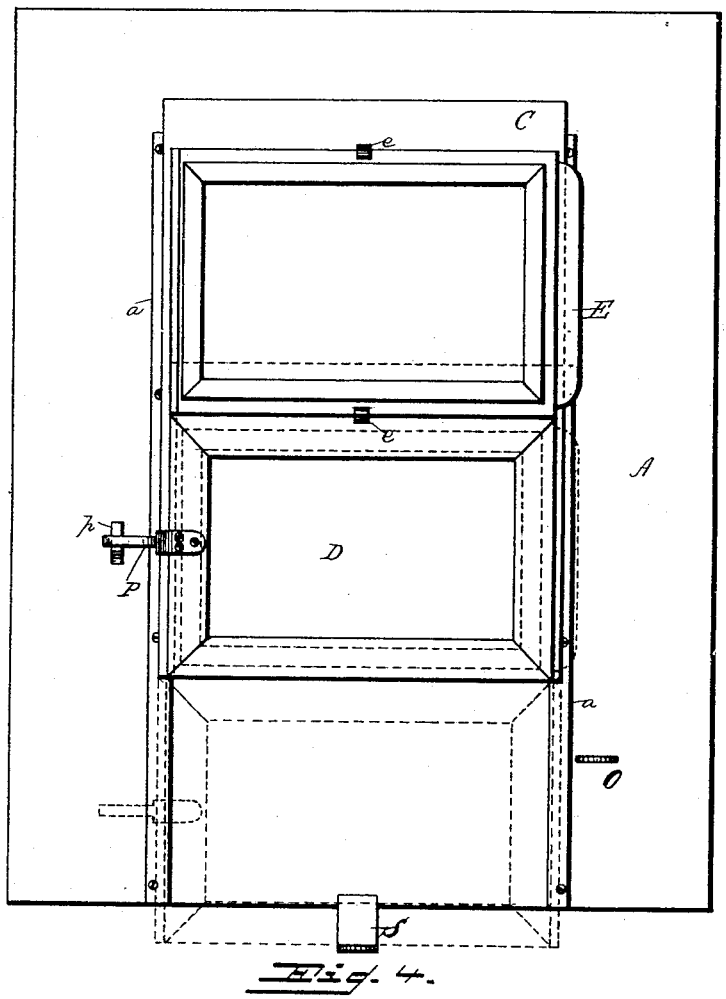

Figure 1 is a perspective of plate-holder. Fig. 2 is a perspective of front side of camera back-board with my improvements applied thereto. Fig. 3 is a side elevation of back-board and appurtenant parts. Fig. 4 is an elevation of rear side of camera back-board with frame and plate-holder thereon.

My invention has relation to photographic cameras; and my improvements have for their object to provide a construction whereby the shutter can be used both for time and instantaneous exposures, and in which the focusing-plate and sensitive plate will be carried by the same frame, so that after focusing an object the sensitive plate may be immediately exposed.

My improvements consist in the peculiar construction and combination of parts, hereinafter fully described.

Referring to the accompanying drawings, A represents a frame, which may be the back-board of the camera. Said frame or back-board has an opening, B, at or about its center.

C represents a frame fitted to move in guides or ways $a\ a$ on the back of the board A. Said frame C has in its lower section a focusing-glass, D, and its upper section is adapted and designed to receive a plate-holder. Said holder is shown at E, and is designed to be held in place in the frame C by springs $e\ e$, or other equivalent fastenings, so that it can be readily attached and detached. Said holder has a shutter, E', hinged at its lower edge at $e'\ e'$, and provided with a spring, $E^2$, which tends to constantly open it.

F represents a rock-shaft sustained in bearings $f\ f$ on the inner side of the board A. Said shaft is encircled by a spiral spring, G, which is attached at one end to a loose collar, H, on said shaft F, and at the other end to a fast collar, I, on said shaft, said loose collar having an arm, $h$, which bears against the board A, so that the spring G is held under tension and tends constantly to rock the shaft in such manner that an arm, K, attached to the fast collar I, will be moved upwardly or toward the opening B. The loose collar H has adjusting-holes $h'$ in its periphery, and by moving the arm $h$ from one to the other of its holes the tension of the spring G may be adjusted. The arm K is bifurcated at its outer extremity and engages with a spring-catch, L, fastened to a shelf or projection, M, which latter is secured to the front or inner side of the board A, below the shaft F.

N represents a lever, which is fulcrumed on a bracket, $n$, on the shelf or projection M, and is provided with a rod or extension, O, which passes through the board A, so as to permit said lever to be operated from the back of said board. By pulling said rod rearwardly the short arm of the lever N will be moved forwardly, pushing the catch L and releasing the arm K from engagement therewith.

P represents a spring-catch on the back of the frame C, which engages with a stud or detent, $p$, on the back of the board A at such an altitude as to hold the focusing-glass D in registration with the opening B in the board A.

In operation the frame C is arranged, in the first instance, with a focusing-glass in registration with the opening B. The sensitive plate having been placed in the holder E, and the latter fitted in the frame C, with the shutter closed and next to the board A, said board keeping the shutter closed while the frame is in its upward position, the focusing of the object is attended to, and on releasing the catch P, by manual operation, from engagement with the detent $p$ the frame C moves downwardly, carrying the focusing-glass away from the opening B and moving the plate-holder downwardly until its shutter comes directly opposite said opening. The shutter is exactly in front of the opening B when the lower edge of the frame C meets a stop, S, on the back-board A, which stop arrests and prevents the further descent of said frame. The shutter now falls downwardly and forwardly, its top or outer edge or a lip, Q, thereon striking against the catch L, moving the latter so that the arm K is released and let free to move upwardly under the influence of the spring G. Said spring G, being stronger than the spring $E^2$, instantly throws the arm K upwardly and, overcoming spring $E^2$, closes the shutter. The exposure thus obtained is instantaneous, as the shutter moves very rapidly in both directions, being opened by the action of the spring $E^2$ and closed by the action of the other spring, G.

R represents a screw fitted in the shelf M below the arm K. For instantaneous exposures this screw is left turned up to such extent that when the shutter falls, as described, it cannot move downwardly far enough to permit its lip Q to get beneath the shoulder $l$ of the catch L as it meets the arm K, and the latter is supported on the head of screw R; but for time-exposures said screw is turned down to such extent that when the shutter falls the arm K will be forced downwardly by said shutter, and the lip Q of the latter will get beneath the shoulder $l$ of catch L and be held thereby.

I have described the holder E as having but one shutter; but it may have two—one on either side—both of which may be operated successively, in the manner already described, by taking the holder out of the frame and reversing it, bringing its back to the front.

The frame C may be arranged to move horizontally, to bring the plate-holder into registration with the opening B, instead of allowing it to drop.

By means of the construction described the plate-holder may be first placed in the frame C on the back-board and the focusing done. Then the frame C is allowed to drop, carrying the focusing-plate away and bringing the sensitive plate into position for action, thereby saving the time heretofore required to move or carry away the focusing-plate and substitute and expose the sensitive plate.

It will be noted that the exposure of the sensitive plate is automatic. The manual operation of releasing the frame C is to permit the transposition of places of the focusing-plate and the plate-holder—that is, the focusing-plate moves away from the focusing-point and the plate-holder moves into such point—and when such transposition occurs the shutter theretofore kept closed opens automatically. It also closes automatically if the adjustment is made for instantaneous exposure, and only requires manual operation for closing in case a time-exposure is wanted.

What I claim as my invention is—

1. The combination, with the frame or back-board A, having opening B, of the frame or slide C and plate-holder E, having a shutter, E', with opening-spring $E^2$, and the rock-shaft F, having spring G and arm K, substantially as shown and described.

2. The combination, with a frame or back-board, A, of rock-shaft F, having fast collar I, with arm K, loose collar H, and spring G, substantially as shown and described.

3. The combination, with the frame or board A, of shaft F, having arm K and spring G, spring-latch L, lever N, and connection O, substantially as shown and described.

4. The combination, with the board or frame A, of the rock-shaft F, having arm K, secured to said shaft, spring G, for rocking said shaft and moving said arm, and a loose collar, H, on said shaft, said collar having adjusting-holes $h'$ and an arm, $h$, whereby the tension of the spring may be adjusted, substantially as shown and described.

5. The combination, with the board or frame A, of the slide or frame C, plate-holder E, having shutter E', rock-shaft F, having spring G and arm K, spring-latch L, lever N, and rod or connection O, said parts being constructed and arranged substantially as shown and described.

6. In a photographing-camera, the combination, with the back-board, of a frame, a plate-holder having a hinged shutter opening by spring action, and a spring-actuated arm supported on said board and held by a catch which is released when the shutter drops, thereby liberating the arm and closing the shutter by spring action, substantially as shown and described.

7. The combination, with the back-board or frame A, of a plate-holder having a shutter, E, a spring-actuated arm, K, a catch, L, and an adjusting-screw, R, said screw being located below said arm and adjustable, so that the shutter may either be held by the catch when said shutter falls or be instantly closed after falling, substantially as shown and described.

8. The combination, with the back-board A, of a movable or sliding frame, C, having a focusing-plate and affording support to a plate-holder, whereby by a sliding action of said frame the focusing-plate may be moved out of focus and the sensitive plate brought into the same position, substantially as shown and described.

9. A photographic camera having a shutter which is opened and closed automatically by or through the movement of the plate-holder to produce instantaneous exposure, substantially as shown and described.

10. A photographic camera in which the sensitive plate is exposed automatically by or through the movement of the plate-holder, as set forth.

11. A photographic camera having a movable frame carrying a focusing-glass and plate-holder with a hinged shutter which opens and closes automatically when the frame is moved and the sensitive plate takes the position of the focusing-plate, substantially as shown and described.

12. A photographic camera having a movable frame and a plate-holder with hinged shutter, said parts operating so that when the frame is moved to bring the sensitive plate into focus the shutter of the plate-holder drops, substantially as shown and described.

13. A photographic camera in which the focusing-plate and plate-holder are adapted to change position, and in which the sensitive plate is automatically exposed when at the focusing-point, substantially as set forth.

In testimony that I claim the foregoing I have hereunto set my hand this 4th day of May, 1886.

WILLIAM L. IMLAY.

Witnesses:
M. D. CONNOLLY,
WILL H. POWELL.